(12) United States Patent
Bellussi et al.

(10) Patent No.: US 7,608,231 B2
(45) Date of Patent: Oct. 27, 2009

(54) PROCESS FOR THE CONTINUOUS REMOVAL OF HYDROGEN SULFIDE FROM GASEOUS STREAMS

(75) Inventors: Giuseppe Bellussi, Piacenza (IT); Alberto De Angelis, Legnano-Milano (IT); Paolo Pollesel, San Donato Milanese-Milano (IT); Marcello Milli, Como (IT)

(73) Assignee: ENI S.p.A., Rome (IT)

( * ) Notice: Subject to any disclaimer, the term of this patent is extended or adjusted under 35 U.S.C. 154(b) by 0 days.

(21) Appl. No.: 12/065,909

(22) PCT Filed: Aug. 31, 2006

(86) PCT No.: PCT/EP2006/008523

§ 371 (c)(1),
(2), (4) Date: Mar. 6, 2008

(87) PCT Pub. No.: WO2007/028539

PCT Pub. Date: Mar. 15, 2007

(65) Prior Publication Data

US 2008/0299026 A1     Dec. 4, 2008

(30) Foreign Application Priority Data

Sep. 7, 2005   (IT) .......................... MI2005A1647

(51) Int. Cl.
*B01D 53/48*   (2006.01)
*C01B 17/16*   (2006.01)
*C01B 17/04*   (2006.01)

(52) U.S. Cl. ..................... 423/224; 423/210; 423/220; 423/573.1; 423/576.4; 423/576.5

(58) Field of Classification Search ............... 423/210, 423/220, 224, 573.1, 576.4, 576.5
See application file for complete search history.

(56) References Cited

U.S. PATENT DOCUMENTS

| 2007/0178033 A1 | 8/2007 | De Angelis et al. |
| 2008/0207951 A1* | 8/2008 | De Angelis et al. ............ 568/26 |

FOREIGN PATENT DOCUMENTS

| WO | 2005 075351 | 8/2005 |
| WO | WO 2005/075351 | 8/2005 |

\* cited by examiner

*Primary Examiner*—Michael A Marcheschi
*Assistant Examiner*—Joseph V Micali
(74) *Attorney, Agent, or Firm*—Oblon, Spivak, McClelland, Maier & Neustadt, L.L.P.

(57) ABSTRACT

Process for the removal in continuous of hydrogen sulfide from gaseous streams containing it, comprising: a) putting a gas containing $H_2S$ in contact with an oxidizing acid aqueous solution of ferric nitrate and containing a heteropolyacid having redox properties; b) filtrating and separating the sulfur produced by the redox reaction; c) oxidizing the ferrous nitrate to ferric nitrate with air; d) recycling the solution containing ferric nitrate and heteropolyacid to the oxidation step (a); e) subjecting the gaseous stream leaving the oxidation reactor (c) to washing with the reduced solution; and f) discharging the gaseous stream.

12 Claims, 1 Drawing Sheet

PROCESS FOR THE CONTINUOUS REMOVAL OF HYDROGEN SULFIDE FROM GASEOUS STREAMS

Figure 1:
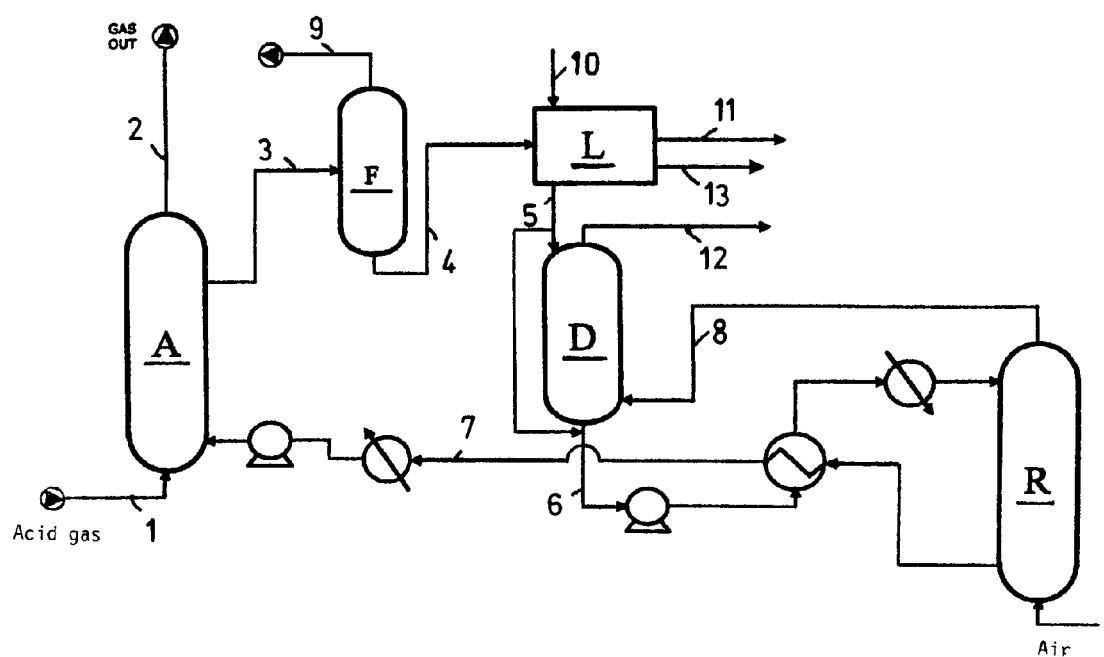

The present invention relates to a process for the removal in continuous of hydrogen sulfide from gaseous streams.

More specifically, the present invention relates to a process for the removal in continuous of hydrogen sulfide and/or mercaptans contained in natural gas or in gas associated with oil wells.

As is known, the hydrogen sulfide normally contained in many natural fields or associated gas is disposed of, if the Claus process cannot be used, either due to the relatively low quantities of $H_2S$ or to the fact that the concentration of hydrogen sulfide is lower than a certain quantity, by transforming it into sulfur by means of a chemical-redox process.

The process which, at present, has improved characteristics and is most widely used in the world is the LO-CAT® $H_2S$ Removal Process which, however, has the disadvantage of producing not marketable sulfur, requiring the use and consumption of considerably costly chemicals (chelating agents) and necessitating the use of extremely diluted iron solutions (max 1.5 g iron/l).

By using acid solutions of ferric salts in the presence of heteropolyacids having general formula (I):

$$H_nXV_yM_{(12-y)}O_{40},\qquad(I)$$

wherein n ranges from 3 to 6, X is selected from P, Si, As, B, Ge, y ranges from 1 to 3 and M consists of Mo or W, the oxidation of hydrogen sulfide to sulfur is obtained with the simultaneous reduction of the ferric salts to ferrous salts.

The subsequent reoxidation of the ferrous salts to ferric salts can be easily obtained by treatment with air at bland temperatures (20-80° C.). The reoxidation of the solution of bivalent iron in an acid environment, in the absence of a heteropolyacid, on the contrary, does not occur even after several days, not even when the solution is heated to a temperature close to boiling point to accelerate its kinetics. The oxidation can take place in an alkaline environment, in this case, however, it is necessary, as in the above-mentioned Locat process, to add chelating products which prevent the precipitation of iron sulfide. The addition of these products, however, involves high additional costs and the presence of impurities in the produced sulfur.

Detailed information on the removal of hydrogen sulfide from natural or associated gas using acid solutions of ferric salts in the presence of heteropolyacids can be found in international patent application PCT/EP2005/000669.

The process previously described can be carried out with different ferric anions, provided that both the ferric salt and the corresponding ferrous salt are soluble in acid aqueous solutions, such as for example nitrate, sulfate, citrate, acetate, perchlorate and chlorate. Among these anions, the nitrate anion is particularly preferred since, through its use, the reoxidation kinetics of the solution of the corresponding ferrous nitrates is particularly rapid.

By using aqueous solutions of ferric nitrate, however, it has been observed that during the reoxidation phase of bivalent iron to trivalent iron, there is also occasionally the formation of a secondary reduction reaction of the nitrate ion with the contemporaneous generation of nitrogen oxides ($No_x$). The nitrogen oxides which are therefore present in the air at the outlet of the reoxidation reactor, could be easily and effectively separated with a normal washing with a solution of NaOH, which transforms them into the corresponding nitrites and nitrates. By operating in this way, there is an effective separation of the nitrogen oxides but also the contemporaneous loss of a chemical reagent.

The Applicants have now found, as is better described in the enclosed claims, that the reduced solution containing ferrous salts can be completely or partially used for the absorption of nitrous vapours containing nitrogen oxides $NO_x$. The ferrous ion is, in fact, capable of effectively absorbing the nitrogen oxides producing stable complexes such as, for example, $Fe(NO)^{2+}$. By operating in this way, there is no loss of chemical products as the solution of ferrous salts is completely reoxidized and recovered. Furthermore, the nitrogen oxides coordinated with the ferrous ion can be effectively reoxidized to nitrate ions in the subsequent reoxidation phase of the ferrous solution, thus closing the nitrate cycle.

For the absorption of nitrogen oxides with a ferrous solution, different reactor configurations can be advantageously used, for example, a plate or filled absorption column, a bubble column or a washing device (scrubber) situated at the head of the reoxidation column of the ferrous solution and preferably operating at room temperature or a temperature close to room temperature.

Another method which can be validly used consists in the use of a reactive column to the head of which part of the solution of ferrous salts is fed whereas the remaining part of the solution of ferrous salts and air are fed to the bottom, so that the absorption of the nitrous vapors takes place at the head of the reactor and the reoxidation in the lower part. In said column, the thermal gradient between head and bottom preferably ranges from room temperature to the operating temperature at the bottom of the column. The used columns can be plate, bubble or filled columns. Experts in the field can select the most suitable configuration on the basis of the dimensioning of the plant and economical criteria in the investment and running of the plant itself.

A plant solution proposed for illustrative and non-limiting purposes is shown in FIG. 1 enclosed.

In FIG. 1, A, R, D, L and F respectively illustrate:

A the absorber in which the hydrogen sulfate contained in the natural or associated gas is absorbed and oxidized to elemental sulfur by means of the redox system used in the process object of the present invention;

R the reoxidation reactor of the reduced solution into which the ferrous nitrate enters and is converted to ferric nitrate;

D the separation or washing column of the nitrous vapours containing the nitrogen oxides $NO_x$;

L the filtration and washing section of the produced sulfur;

F is the separation apparatus (or flash) of the incondensable or volatile compounds from the liquid stream of ferrous solution, such as, for example, methane, ethane, $CO_2$, by the decompression action of the solution itself. Said apparatus can be advantageously used if the operating pressure of the absorber is higher than the operating value of the rest of the plant.

The natural or associated gas (1) to be purified is fed to the base of the reactor A into which the recycled oxidizing solution (7), containing the ferric nitrate and heteropolyacid having general formula (I) in solution, is fed. The softened gas (2) substantially free of $H_2S$ is discharged from the head of the reactor A, and can be introduced into the system or fed to other forms of treatment, whereas the reduced solution of ferrous nitrate and heteropolyacid containing elemental sulfur in dispersion is recovered with the stream (3). Filtration devices (L) allow the sulfur to be separated from the solution, which can be sent to the reoxidation unit. The latter comprises the oxidation reactor R and the separation and washing column D of the nitrous vapours containing nitrogen oxides $NO_x$.

In particular, the reduced solution (6) is fed to the head of the oxidation reactor R to the base of which the oxidizing gas consisting of air, is fed, at atmospheric pressure or a higher value, so as to obtain the complete reoxidation of the ferrous nitrate to ferric nitrate which can therefore be recycled, as a stream (7), to the oxidation reactor of the hydrogen sulfide A. The gas phase (8) leaving the reactor R, impoverished in oxygen, cannot always be discharged into the environment as it may contain nitrogen oxides $NO_x$ which have been formed as secondary products during the reoxidation phase. In order to eliminate the latter, the stream (8) leaving the reoxidation reactor R, is fed to the base of the washing column D, for example a plate or filled column, to the head of which the same reduced solution (5) coming from the separation of elemental sulfur, is totally or partially fed. The nitrogen oxides $NO_x$ are separated in the washing column D, as they form stable complexes with the ferrous iron contained in the solution fed (5). The gas thus purified (12) can be freely discharged and sent to conventional treatment.

The solution leaving the washing column D, containing both ferrous nitrate and the stable complexes formed by the $NO_x$ with the ferrous ion, form the stream (6), mentioned above, which is fed to the reoxidation reactor.

The stream (10) consists of water destined for the washing of the sulfur, whereas the stream (11) is clean sulfur destined for drying and storage and the stream (13) consists of waste water of the sulfur washing destined for treatment.

The process for the removal in continuous of hydrogen sulfide from gaseous streams, object of the present invention, can be better understood by referring to the following examples, which represent an illustrative and non-limiting embodiment.

REFERENCE EXAMPLE 1

Oxidation of $H_2S$ with a 0.1 Molar Solution of $Fe(NO_3)_3/H_6PW_9V_3O_{40}$ and the Subsequent Reoxidation of the Reduced Solution 40.4 g of $Fe(NO_3)_3.9H_2O$ (0.1 moles) and 24.84 g of $H_6PW_9V_3O_{40}$ (0.01 moles), are dissolved in 1,000 ml of distilled water, obtaining a limpid solution with a pH of about 1. This solution is introduced into a stirred reactor, thermostat-regulated at 25° C. into which $H_2S$ at 10% in nitrogen is passed at a flow-rate of 5 Nl/h for a total of 3 hours, obtaining the complete oxidation of the $H_2S$ to sulfur and the reduction of 70% of ferric iron to ferrous iron.

The reduced solution is filtered thus separating the sulfur produced by oxidation of the hydrogen sulfide.

The reduced solution is heated in a reactor to 80° C., in a flow of air, obtaining the complete reoxidation of bivalent iron to trivalent iron. During the reaction, nitrogen oxides are formed, which are absorbed in two successive traps each containing 500 ml of NaOH at 10% by weight in water. The concentration of the nitrites and nitrates in the first soda trap amounts to 257 ppm. The second trap does not contain nitrites and nitrates, thus showing the complete separation of the $NO_x$ produced.

EXAMPLE 2

Oxidation of $H_2S$ with a 0.1 Molar Solution of $Fe(NO_3)_3/H_6PW_9V_3O_{40}$ and the Subsequent Reoxidation of the Reduced Solution (Absorption in Ferrous Solution)

40.4 g of $Fe(NO_3)_3.9H_2O$ (0.1 moles) and 24.84 g of $H_6PW_9V_3O_{40}$ (0.01 moles), are dissolved in 1,000 ml of distilled water, obtaining a limpid solution with a pH of about 1. This solution is introduced into a stirred reactor, thermostat-regulated at 25° C. into which $H_2S$ at 10% in nitrogen is passed at a flow-rate of 5 Nl/h for a total of 3 hours obtaining the complete oxidation of the $H_2S$ to sulfur and the reduction of 70% of trivalent iron to bivalent iron.

The cycle described above is repeated again obtaining another litre of reduced ferrous solution, under the same conditions. Both reduced solutions are filtered thus separating the sulfur produced by oxidation of the hydrogen sulfide.

1 litre of reduced solution is heated in a reactor to 80° C., in a flow of air, obtaining the complete reoxidation of bivalent iron to trivalent iron. During the reaction nitrogen oxides are formed, which are absorbed in a trap containing 1 litre of the second ferrous solution coming from the previous reduction cycle, and at the tail of said trap a second trap containing 500 ml of NaOH at 10% by weight in water.

The nitrogen oxides are completely absorbed by the ferrous solution whereas the concentration of nitrites and nitrates in the soda trap proves to be lower than 20 ppm (experimental measurement limit).

EXAMPLE 3

Oxidation of $Fe(NO_3)_2/H_6PW_9V_3O_{40}$ Containing $NO_x$

The reduced solution which, in Example 2, had absorbed the nitrogen oxides (see Example 2), is introduced into a reactor at 80° C. and heated in a flow of air.

The complete reoxidation of the iron present to trivalent iron is obtained.

COMPARATIVE EXAMPLE 4

Oxidation of $H_2S$ with a 0.3 Molar Solution of $Fe(NO_3)_3/H_6PW_9V_3O_{40}$ and the Subsequent Reoxidation of the Reduced Solution 121.2 g of $Fe(NO_3)_3.9H_2O$ (0.3 moles) and 74.67 g of $H_6PW_9V_3O_{40}$ (0.03 moles), are dissolved in 1,000 ml of distilled water, obtaining a limpid solution with a pH of about 1. This solution is introduced into a stirred reactor, thermostat-regulated at 25° C. into which $H_2S$ at 10% in nitrogen is passed at a flow-rate of 10 Nl/h for a total of 4 hours and 30' obtaining the complete oxidation of the $H_2S$ to sulfur and the reduction of 70% of trivalent iron to bivalent iron.

The reduced solution is filtered thus separating the sulfur produced by oxidation of the hydrogen sulfide.

The reduced solution is heated in a reactor to 80° C., in a flow of normal air at atmospheric pressure, obtaining the complete reoxidation of bivalent iron to trivalent iron. During the reaction, there is a significant formation of nitrogen oxides which are absorbed by passing the gases leaving the reactor into two successive traps each containing 500 ml of NaOH at 10% by weight in water. The concentration of the nitrites and nitrates in the soda traps amounts to 1,578 ppm.

EXAMPLE 5

Oxidation of H$_2$S with a 0.3 Molar Solution of Fe(NO$_3$)$_3$/H$_6$PW$_9$V$_3$O$_{40}$ and the Subsequent Reoxidation of the Reduced Solution (Absorption in Ferrous Solution)

121.2 g of Fe(NO$_3$)$_3$.9H$_2$O (0.3 moles) and 74.67 g of H$_6$PW$_9$V$_3$O$_{40}$ (0.03 moles), are dissolved in 1,000 ml of distilled water, obtaining a limpid solution with a pH of about 1. This solution is introduced into a stirred reactor, thermostat-regulated at 25° C. into which H$_2$S at 10% in nitrogen is passed at a flow-rate of 10 Nl/h for a total of 4 hours and 30 minutes obtaining the complete oxidation of the H$_2$S to sulfur and the reduction of 70% of trivalent iron to bivalent iron.

The cycle described above is repeated again obtaining another litre of reduced ferrous solution, under the same conditions. Both reduced solutions are filtered thus separating the sulfur produced by oxidation of the hydrogen sulfide.

1 litre of reduced solution is heated in a reactor to 80° C., in a flow of air, obtaining the complete reoxidation of bivalent iron to trivalent iron. During the reaction nitrogen oxides are formed, which are absorbed in a trap containing 1 litre of the second ferrous solution coming from the previous reduction cycle, and at the tail of said trap a second trap containing 500 ml of NaOH at 10% by weight in water.

The nitrogen oxides are completely absorbed by the ferrous solution whereas the concentration of nitrites and nitrates in the soda trap proves to be lower than 20 ppm (experimental measurement limit).

EXAMPLE 6

Oxidation of Fe(NO$_3$)$_2$/H$_6$PW$_9$V$_3$O$_{40}$ Containing NO$_x$

The reduced solution which, in the previous Example, had absorbed the nitrogen oxides (see Example 5), is introduced into a reactor at 80° C. and heated in a flow of air.

The complete reoxidation of the iron present to trivalent iron is obtained.

The invention claimed is:

1. A process for the continuous removal of hydrogen sulfide from a gaseous stream containing hydrogen sulfide, comprising:
  a) putting a gas containing H$_2$S in contact with an oxidizing acidic aqueous solution of ferric nitrate which further comprises a heteropolyacid having redox properties, as such or partially salified with an alkaline metal or with ammonium, selected from those having general formula (I):

$$H_n X V_y M_{(12-y)} O_{40},$$ (I)

wherein n is an integer ranging from 3 to 6; X is selected from P, Si, As, B, and Ge; y is an integer ranging from 1 to 3; and M is selected from Mo and W;
  b) filtering and separating sulfur produced in a) as a result of the oxidizing effect of the ferric nitrate, which is reduced to ferrous nitrate in solution with heteropolyacid;
  c) oxidizing the ferrous nitrate from b) to ferric nitrate with air in an oxidation reactor thereby producing a solution comprising ferric nitrate and heteropolyacid;
  d) recycling the solution comprising ferric nitrate and heteropolyacid from d) to redox (a);
  e) subjecting a gaseous stream comprising one or more nitrogen oxides leaving the oxidation reactor in (c), to washing in a washing apparatus to the head of which is fed from 10 to 100% by weight of the reduced solution coming from sulfur separation (b), before the same is fed to the oxidation (c); and
  f) discharging the gaseous stream.

2. The process according to claim 1, wherein said heteropolyacid is used in a solid form which is insoluble in water and is selected from:
  a partial or complete salification with metals, whose salts are insoluble, selected from cesium, ammonium, potassium, silver and thallium(I);
  one supported and immobilized on silica;
  one supported and immobilized on mesoporous molecular sieves; and
  one supported and immobilized on activated carbon.

3. The process according to claim 1, wherein the gaseous stream consists of natural gas or an associated gas coming from a production well.

4. The process according to claim 1, wherein the ferric nitrate is present in the oxidizing solution in concentrations ranging from 0.01 to 3 moles/l.

5. The process according to claim 1, wherein the heteropolyacid compound (I) is present in concentrations ranging from 0.01 to 0.5 moles/l.

6. The process according to claim 1, wherein the molar ratio heteropolyacid compound (I)/ferric nitrate ranges from 1/1 to 1/100.

7. The process according to claim 1, wherein the acid aqueous solution has a pH ranging from 0 to 6.

8. The process according to claim 1, wherein the hydrogen sulfide is present in the gas fed in a concentration ranging from 0.01 to 100% by volume.

9. The process according to claim 1, wherein the oxidation step (c) takes place at a temperature ranging from 20 to 100° C. and at atmospheric pressure or a value higher than atmospheric pressure, up to 50 atmospheres.

10. The process according to claim 1, wherein the redox reaction (a) and oxidation reaction (c) and the washing phase (e) are effected in bubble, filled or plate columns.

11. The process according to claim 1, wherein the oxidation reaction (c) and the washing phase (e) are effected in a single column wherein the washing column overlies the oxidation column and operates at a temperature lower than or equal to the oxidation column.

12. The process according to claim 3, wherein the pressure in the redox reactor ranges from 1 atmosphere to the pressure of the production well.

* * * * *